(12) United States Patent  
Singh (10) Patent No.: US 6,506,040 B1
(45) Date of Patent: Jan. 14, 2003

(54) TIRE CURING PRESS MOLD HEIGHT ADJUSTMENT APPARATUS

(75) Inventor: Anand P. Singh, Akron, OH (US)

(73) Assignee: McNeil & NRM, Inc., Akron, OH (US)

( * ) Notice: Subject to any disclaimer, the term of this patent is extended or adjusted under 35 U.S.C. 154(b) by 188 days.

(21) Appl. No.: 09/771,041

(22) Filed: Jan. 26, 2001

(51) Int. Cl.[7] .............................................. B29C 35/02
(52) U.S. Cl. ....................................... 425/28.1; 425/47
(58) Field of Search ........................... 425/28.1, 35, 47, 425/189, 193, 195

(56) References Cited

U.S. PATENT DOCUMENTS

| | | | |
|---|---|---|---|
| 4,332,536 A | | 6/1982 | Singh et al. ................... 425/33 |
| 4,390,334 A | | 6/1983 | Singh et al. ................ 425/28.1 |
| 4,669,964 A | * | 6/1987 | Amano et al. ............. 425/34.1 |
| 5,316,458 A | | 5/1994 | Lesneski ....................... 425/34 |
| 6,139,301 A | * | 10/2000 | Elleder et al. ............. 425/28.1 |

* cited by examiner

*Primary Examiner*—James P. Mackey
(74) *Attorney, Agent, or Firm*—Renner, Kenner, Greive, Bobak, Taylor & Weber (57) ABSTRACT

A tire curing press (10) having a frame (20), a bolster (16) for mounting a lower mold section (12), a cylinder (35) mounted on the frame, a cylinder rod (38) of the cylinder for moving the bolster and the lower mold section between a closed position and a partially open position, moveable indexing apparatus (50) interposed between the cylinder rod and the bolster, and a plurality of steps (65) of differing thickness on the indexing apparatus, whereby moving a selected one of the plurality of steps into alignment with the cylinder rod establishes a different partially open position of the lower mold section.

24 Claims, 6 Drawing Sheets

TIRE CURING PRESS MOLD HEIGHT ADJUSTMENT APPARATUS

TECHNICAL FIELD

The present invention relates generally to presses for the shaping and curing of pneumatic tires. More particularly, the present invention relates to mold height adjustment apparatus for tire curing presses. More specifically, the present invention relates to mold height adjustment apparatus which permits the quick and easy alteration of tire curing press components to accommodate tire molds of different sizes in the press so that a number of sizes of tires can be manufactured from time to time in the same tire curing press.

BACKGROUND ART

It has always been necessary to employ tire curing presses in a number of sizes to accommodate the large variety of pneumatic tire sizes required for vehicles of different sizes, weights and performance characteristics. Since tire shaping and curing operations are necessarily carried out at high pressures, it is required that tire curing presses be constructed of heavy steel members which can both manipulate the tire molds during press opening and closing and provide the requisite squeeze pressure to withstand the internal pressures encountered during the tire curing operation. Since the size and cost of tire curing presses varies greatly with tire size, it has long been economically advantageous to employ tire curing presses in a number of sizes as a function of tire size. Thus curing presses of different sizes are commonly manufactured for passenger tire, large passenger tire/small truck tire and truck tire applications or portions of tires falling in those categories.

Even within the above tire size categories there are numerous tire sizes which require molds of differing dimensions. While some mold dimensions for tire sizes within a particular category may be accommodated without altering the configuration of the press, it is widely recognized that tire curing presses within a category advantageously have a mold height adjustment capability to accommodate tire molds of different heights, so that a range of tire sizes can be optimally processed in a single tire curing press size.

Mold height adjustment apparatus operates to establish an adjusted position when the press is closed so that the upper and lower mold sections are separated a fairly short distance through which one of the mold sections is moved, normally by cylinders, to the fully closed position of the molds prior to the introduction of curing pressure within the closed mold sections. Various approaches have been taken over the years to effect mold height adjustment in tire curing presses to accommodate upper and lower mold sections having different combined heights when in the fully closed position. Generally, mold height adjustment mechanisms have employed spacers of different thickness or adjusting screw and nut arrangements to achieve the variable adjusted positioning of press components to optimize operating with mold sections of different heights.

In some instances cylindrical spacers of different thicknesses have been interposed between the cylinder rods and rod extensions which finally close the mold sections and apply the squeeze forces thereto. To achieve different adjusted positions a variety of different sized spacers is necessary for each of the squeeze cylinders, thus creating a significant inventory problem. While these spacers are not themselves expensive and do provide accurate mold height adjustment, they do add significant cost to the design of the presses and are time-consuming to change, which results in significant downtime and resultant loss of production for the presses. Due to the disassembly and handling requirements, mold change with some spacer installations may reach excessive downtime in that the time required may be several hours and approach eight hours in the instance of some large truck presses.

A variation of a spacer arrangement contemplates that the squeeze cylinder rods or rod extensions have a plurality of axially or vertically spaced annular grooves. A removable stop collar is selectively positioned in one of the grooves to engage a stop tube which surrounds the cylinder rods or rod extensions. This arrangement has essentially the same features and disadvantages as the conventional cylindrical spacers except that it is not necessary to inventory any significant number of stop collars, except as replacement or repair parts.

One type of adjusting screw and nut mold height adjustment apparatus which has long been used operates in conjunction with the positioning of the upper mold section of a tire mold. In this apparatus the crossbeam of the press is connected to the upper bolster supporting the top mold section by a single central adjusting sleeve which is externally threaded. An internally threaded ring engages the threads of the adjusting sleeve and is nonrotatably attached to the crossbeam. Therefore, rotation of the adjusting sleeve effects selective vertical positioning of the upper mold section relative to the lower mold section. A ring gear attached to the adjusting sleeve may be employed with other gearing to facilitate rotation of the adjusting sleeve.

Another type of adjusting screw and nut mold height adjustment apparatus operates in conjunction with the positioning of the lower mold section of a tire mold. In this apparatus the blind end of each of the squeeze cylinders is supported on an adjusting screw or stud which is externally threaded. An internally threaded nut engages the external threads on the adjusting screw and is journaled in the press frame. Each nut has an attached sprocket. A drive chain extending around the sprocket on each of the nuts for each squeeze cylinder permits simultaneous, equiangular rotation of each of the nuts to adjust the vertical position of each of the squeeze cylinders and thus the lower mold section.

The above-described adjusting screw and nut mold height adjustment mechanisms have the advantage that they are relatively easy to operate and set up in comparison with the above-described spacer arrangements. However, the clearance in the threads of the screw and nut seriously compromise the vertical location accuracy and concentricity positions of the mold part that is supported thereby, as compounded by wear. Additionally, the complexity and precision required to achieve even acceptable accuracy in these mechanisms add substantially to the cost of a curing press and constitute high-maintenance mechanisms.

Thus, the mold height adjustment mechanisms currently in use in the industry all possess a mixture of advantages and disadvantages and are somewhat designed to take into account the structure of the particular press. Therefore, no single type of mold height adjustment mechanism has achieved widespread acceptance in the industry.

DISCLOSURE OF THE INVENTION

Therefore, an object of the present invention is to provide mold height adjustment apparatus for a tire curing press which employs an indexing ring with discrete vertical steps of differing vertical heights which are selectively interposed between squeeze cylinder rods and a lower bolster of the press to provide mold height adjustment for a plurality of mold sizes. Another object of the invention is to provide such mold height adjustment apparatus wherein the indexing ring contains a plurality of discrete vertical steps for each squeeze cylinder, whereby rotation of the indexing ring simultaneously provides the desired mold height adjustment at each squeeze cylinder for a particular tire mold. A further object of the invention is to provide such mold height adjustment apparatus having a locking assembly which locks the indexing ring with a selected discrete vertical step aligned with the squeeze cylinder rod, while permitting release of the locking assembly for moving the indexing ring to another discrete vertical step, to be locked thereat for operating tire molds having a different height dimension.

Another object of the present invention is to provide mold height adjustment apparatus for a tire curing press which provides the positioning precision of prior art spacer mechanisms without the attendant disadvantages. Yet another object of the invention is to provide such mold height adjustment apparatus which is relatively easy to operate and set up in the manner of prior art adjusting screw and nut mechanisms without the attendant disadvantages. Still another object of the invention is to provide such mold height adjustment apparatus which permits effecting a mold height adjustment to accommodate a different mold size in a time interval of approximately 15 minutes rather than a matter of several hours.

Still another object of the present invention is to provide a mold height adjustment mechanism for a tire curing press wherein an indexing ring carries a plurality of attached spacers of differing sizes which are rotated in and out of alignment with the piston rods of the squeeze cylinder to thus make the spacers self-storing and thereby eliminate the need to inventory and store a large number of spacers at a location remote from the tire curing press. Another object of the present invention is to provide such mold height adjustment apparatus that requires a minimum of space within the body of the press such that an enlarged press envelope is not required to incorporate the operating components of the mold height adjustment apparatus. Another further object of the invention is to provide such mold height adjustment apparatus which is of relatively low cost, particularly as regards adjusting screw and nut mechanisms, which has minimal maintenance costs and downtime associated with prior art mold height adjustment mechanisms and which can be quickly and easily operated by a single individual operating a few noncomplex hydraulic controls and manual actuators.

In general, the present invention contemplates a tire curing press having a frame, a bolster for mounting a lower mold section, a cylinder mounted on the frame, a cylinder rod of the cylinder for moving the bolster and the lower mold section between a closed position and a partially open position, moveable indexing apparatus interposed between the cylinder rod and the bolster, and a plurality of steps of differing thickness on the indexing apparatus, whereby moving a selected one of the plurality of steps into alignment with the cylinder rod establishes a different partially open position of the lower mold section.

PREFERRED EMBODIMENT FOR CARRYING OUT THE INVENTION

A mold height adjustment mechanism according to the concepts of the present invention, as generally indicated by the numeral 10 in the attached drawings, may be incorporated in various types and constructions of presses deigned to shape and cure tires. While the mold height adjustment mechanism 10 is shown in conjunction with a particular hydraulic press, it is equally adaptable to various hydraulic and other press designs.

Figure 1:
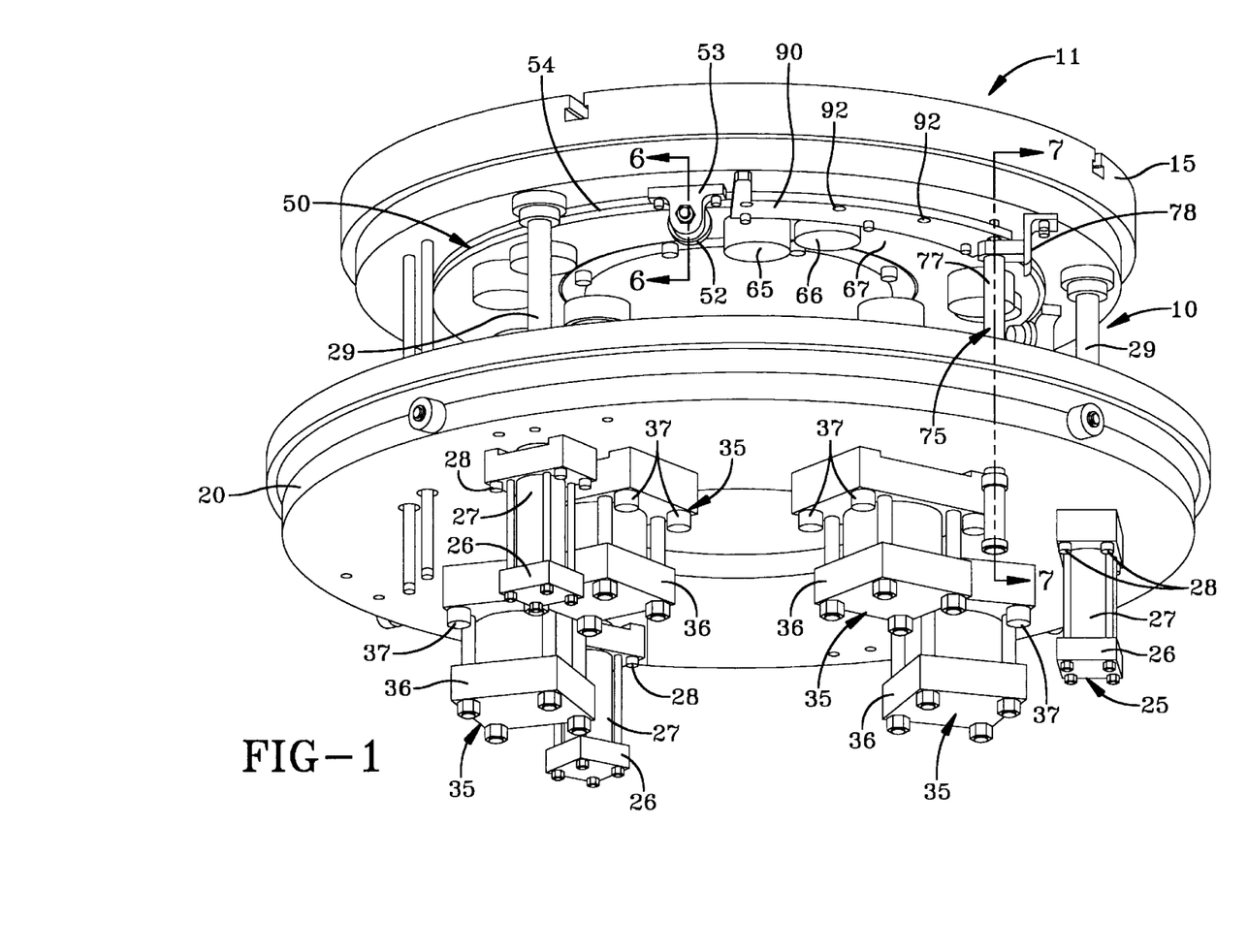
FIG. 1 is a fragmentary perspective view showing a portion of a tire curing press frame and a lower bolster and platen with components of mold height adjustment apparatus according to the concepts of the present invention shown in operative relation thereto.
Figure 2:
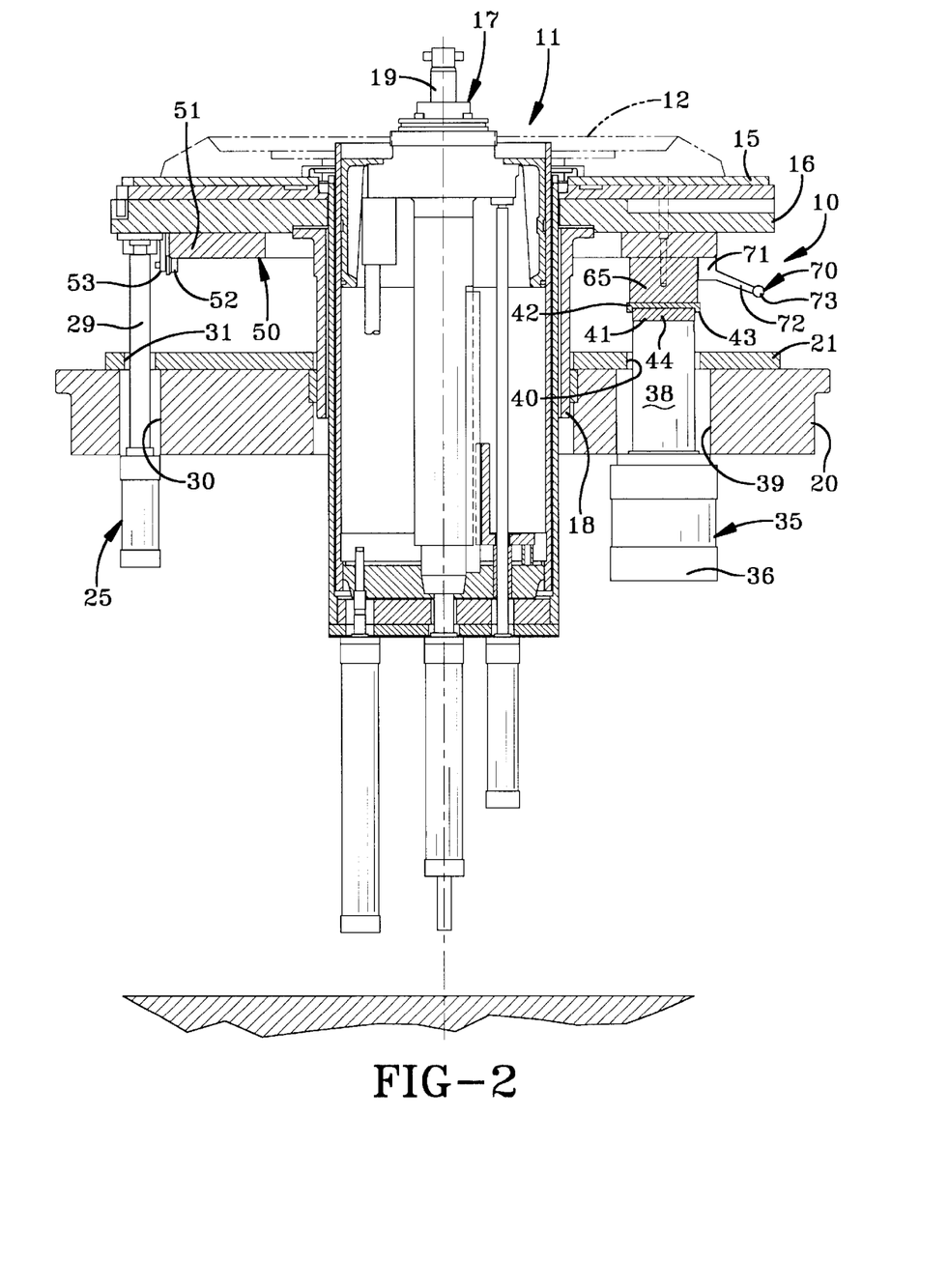
FIG. 2 is a fragmentary vertical sectional view of the tire curing press and mold height adjustment mechanism of FIG. 1 taken substantially along line 2—2 of FIG. 5 at a maximum height adjustment position of the mold height adjustment mechanism.

Referring now to the drawings, and particularly to FIGS. 1 and 2, a portion of an exemplary press, generally indicated by the numeral 11, is shown in sufficient detail for an understanding of the structure and operation of the mold height adjustment mechanism 10. The press 11 is depicted as mounting a lower mold section 12 with a separable relatively movable mating upper mold section (not shown) mounted on a press head (not shown) in a conventional manner. It should be appreciated that the mold height adjustment mechanism 10 may be adapted for use in conjunction with a press having three-part segmented mold sections as well as two-piece mold sections, both of which have been well known in the art for many years. The lower mold section 12 is mounted on a platen 15 which is secured to a bolster 16 which may take various configurations depending upon the press construction and other considerations, all as is well known to persons skilled in the art. The lower mold 12, platen 15 and lower bolster 16 are centrally apertured to receive a center mechanism, generally indicated by the numeral 17. The center mechanism 17 is generally contained within an annular housing 18. The center mechanism 17 also has a center post 19 which mounts a flexible bladder, diaphragm or bag (not shown) which may take any of a wide variety of shapes for purposes of providing for transmittal of temperature and pressure produced internally thereof to an uncured or green tire band positioned within the mold sections.

The lower bolster 16 and lower mold section 12 are supported and vertically positioned relative to a fixed frame or plate 20 which is attached to the base of press 11. If desired the frame 20 may carry a layer of insulation 21 to restrict heat transfer downwardly of the lower mold section 12.

The mold height adjustment mechanism 10 has a lift assembly, generally indicated by the numeral 25, for raising the lower bolster 16 and lower mold section 12 relative to the frame 20. As shown, the lift assembly 25 consists of a plurality of lift cylinders 26 which are preferably equiangularly spaced about the annular frame 20. As seen in particular in FIGS. 1 and 5, three lift cylinders 26 are positioned at substantially 120-degree angular spacing. The cylinder casings 27 of lift cylinders 26 are mounted on the underside of the frame 20 by a plurality of machine screws 28 or other suitable fasteners (FIG. 1). The lift cylinders 26 have cylinder rods 29 that extend through bores 30 and 31 in the frame 20 and layer of insulation 21, respectively (FIG. 2). The cylinder rods 29 terminate in rod receivers 32 that are affixed to the undersurface of the lower bolster 16. The cylinder rods 29 are seen in the extended position in FIG. 1 of the drawings where the mold height adjusting mechanism 10 may be operated to adjust for mold sections having a different height.

The frame 20 also carries a plurality of squeeze cylinders, generally indicated by the numeral 35, which move the lower bolster 16 and lower mold section 12 to effect final closing of the mold parts and apply the requisite squeeze pressure thereto. In a manner similar to the lift cylinders 26 the squeeze cylinders are preferably equiangularly spaced about the annular frame 20. As shown particularly in FIG. 5, four squeeze cylinders 35 are positioned at substantially 72-degree angular spacing. More or less squeeze cylinders 35 maybe employed depending on press size and other considerations. The cylinder casings 36 of squeeze cylinders 35 are mounted on the underside of the frame 20 by a plurality of machine screws 37 or other suitable fasteners (FIG. 1). The squeeze cylinders 35 have cylinder rods 38 that extend through bores 39 and 40 in the frame 20 and layer of situation 21, respectively (FIG. 2). Each of the cylinder rods 38 may have an insulating cap 41 at the upper extremity thereof to restrict the transfer of heat from the lower bolster 16 to the squeeze cylinders 35 (FIG. 2). The insulating caps 41 may advantageously seat shim retainers 42 which have a peripheral flange 43 which maintains the shim retainers 42 in place throughout the operating cycle of the press 11 and mold height adjustment operations. One or more shims 44, if required, are positioned between the insulating cap 41 and the shim retainer 42 to effect leveling of the lower bolster 16. It is to be appreciated that once a press 11 is installed and the requisite shims 44 are positioned under the shim retainer 42, no further adjustment of press 11 in this respect is normally required.

The mold height adjustment mechanism 10 has an indexing assembly, generally indicated by the numeral 50, interposed between the lower bolster 16 and shim retainers 42 of the squeeze cylinders 35. The indexing assembly 50 includes an indexing ring 51 which underlies a portion of the lower bolster 16 and radially and circumferentially overlies the squeeze cylinders 35. The indexing ring 51 is suspended in movable proximity to the lower bolster 16 by a plurality of rollers 52 that both radially and axially position the indexing ring 51 for selective rotational motion relative to the lower bolster 16. As seen in FIGS. 1, 2, 5 and 6, the rollers 52 are positioned by a plurality of roller mounting brackets 53 which are attached to the underside of the lower bolster 16 by machine screws 54 or other suitable fasteners (FIG. 1). The roller mounting brackets 53 carry a shaft 55 on which the rollers 52 are freely rotatably mounted (FIG. 6). The rollers retain the indexing ring 51 in position by the rollers 52 having a horizontal surface 56 and an angle surface 57. As seen in FIG. 6, the horizontal surface 56 contacts the bottom surface 58 of indexing ring 51 and the angle surface 57 contacts a beveled corner 59 of the indexing ring 51 to thus both radially and axially position the indexing ring relative to the lower bolster 16. It will be appreciated that separate rollers could be configured and located to separately individually impart the radial and axial forces requisite to positioning and rotatably supporting the indexing ring 51.

Figure 5:
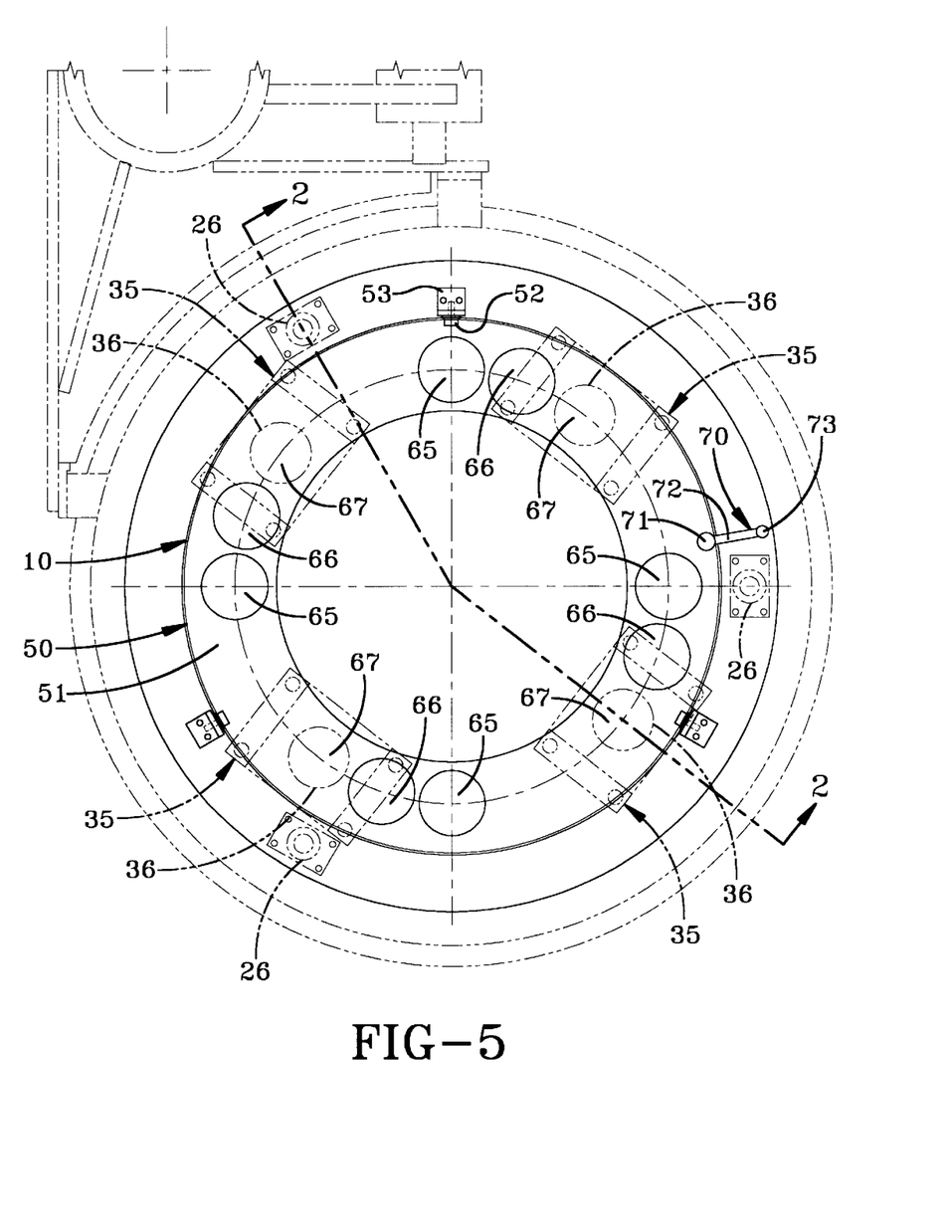
FIG. 5 is an underside plan view of the indexing ring of the mold height adjustment apparatus showing the relative positioning of various components and the interrelationship with other components of the tire curing press.
Figure 6:
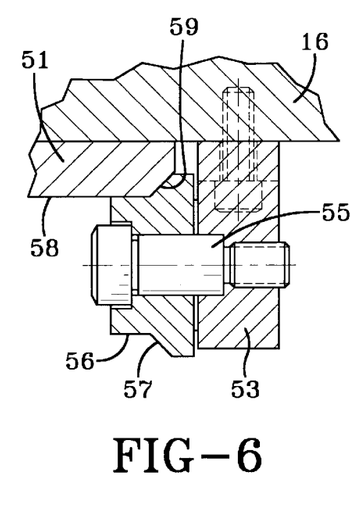
FIG. 6 is a fragmentary sectional view taken substantially along the line 6—6 of FIG. 1 showing details of the roller bracket and roller which notably supports the indexing ring.

The indexing ring 51 of indexing assembly 50 carries a plurality of discrete steps or risers 65 and 66, as best seen in FIGS. 1 and 5, which with indexing ring 51 establish differing selected mold height positions to accommodate different predetermined molds having different vertical heights when mounted in the press 11. The steps 65, 66 maybe cylindrical blocks of a selected height having a diameter which is preferably substantially the same as the diameter of the cylinder rods 38 of squeeze cylinders 35 and being held in place on indexing ring 51 by machine screws 68 or other suitable fasteners. In addition to the positions established by the steps 65, 66, an additional position 67 is established by the thickness of the indexing ring 51 where no step or riser is present. As best seen in FIG. 5, a plurality of groupings of the steps 65, 66 and position 67 are provided, with a grouping located proximate to and operatively interrelating with each of the squeeze cylinders 35. While three positions are shown and described herein, thereby providing three different mold height adjustments, it is to be appreciated that more or less positions could be employed on each of the groupings.

Figure 3:
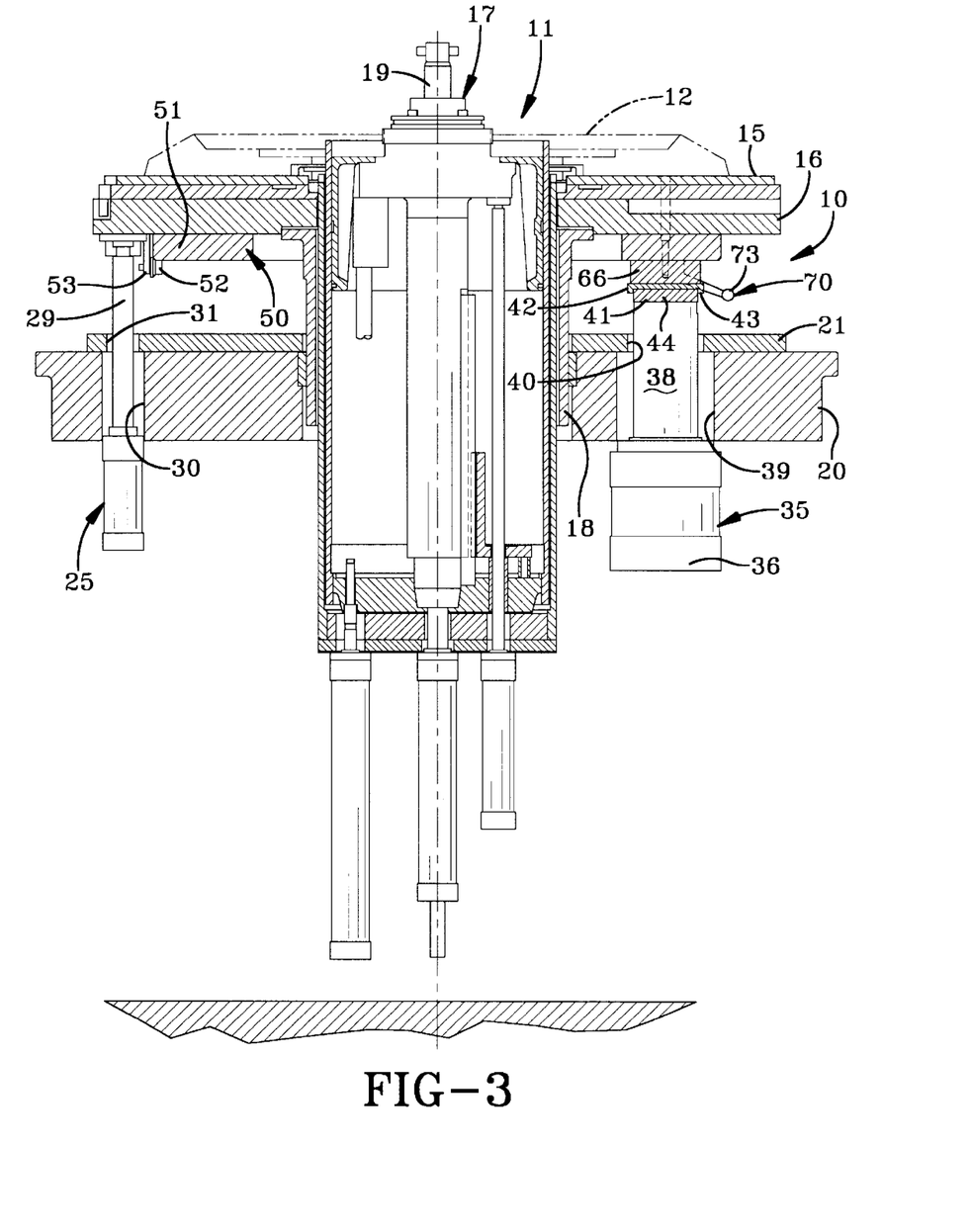
FIG. 3 is a vertical cross-sectional view similar to FIG. 1 showing an intermediate height position of the mold height adjustment apparatus.
Figure 4:
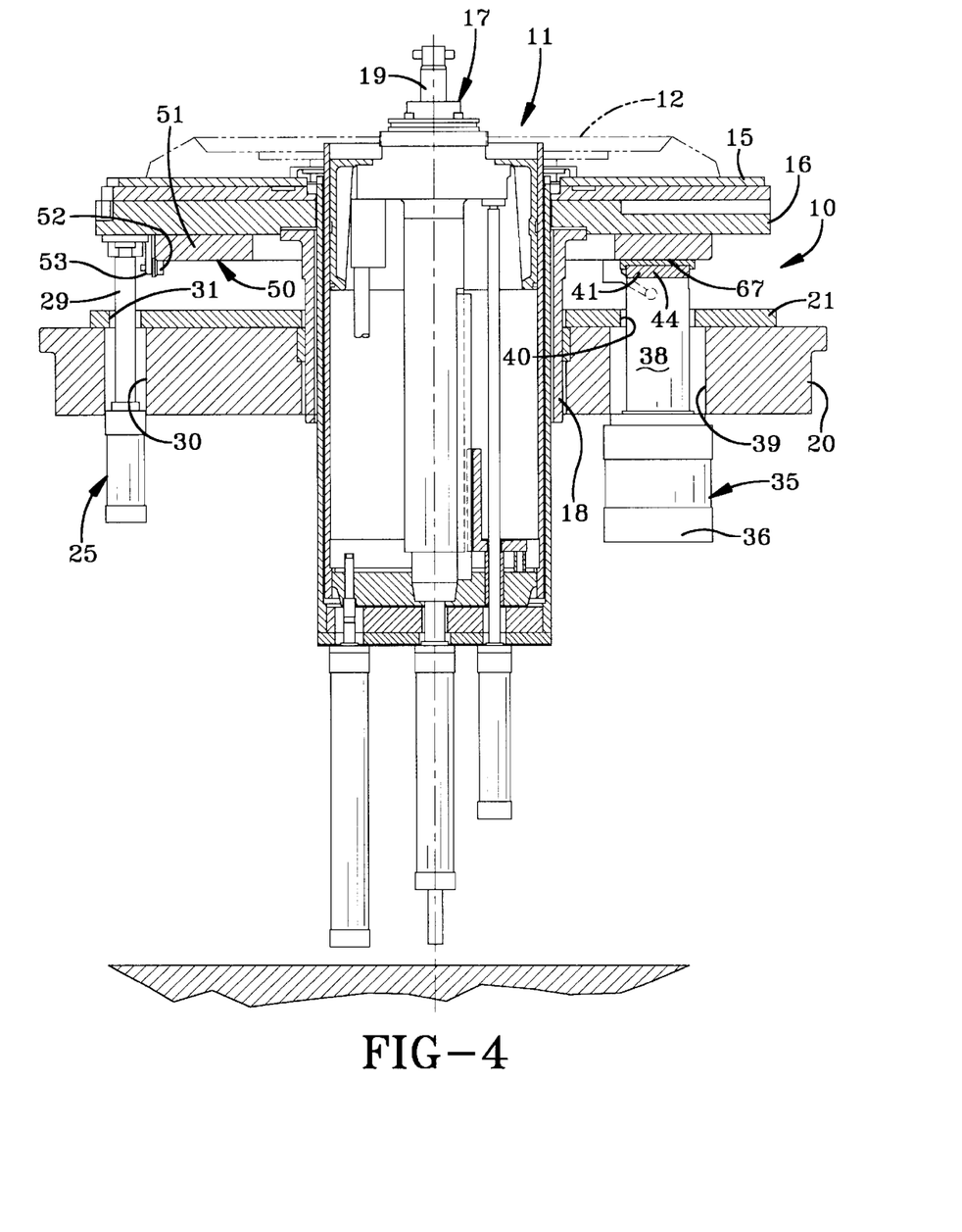
FIG. 4 is a view similar to FIGS. 2 and 3 showing a minimum height position of the mold height adjustment apparatus.

For exemplary purposes, FIGS. 2 and 5 show the highest steps 65 aligned with each of the squeeze cylinders 35 which would accommodate the smallest mold height for which the mold height adjustment mechanism 10 is designed. Upon actuation of lift assembly 25 to raise lower bolster 16 to provide a clearance between steps 65 and shim retainers 42 on cylinder rods 38 of the squeeze cylinders 35, the indexing ring 51 maybe rotated to align steps 65 or 66 or position 67 with squeeze cylinders 35. Thereupon, the lift cylinder rods 29 are retracted to position the lower bolster 16 at the new height. The indexing assembly 50 is shown at an intermediate height in FIG. 3 having the steps 66 aligned with the squeeze cylinders 35. The indexing assembly 50 is shown at its lowest height in FIG. 4 having the position 67 constituting the thickness of the indexing ring 51 aligned with the squeeze cylinders 35 to accommodate a maximum height mold.

The indexing ring 51 of indexing assembly 50 may be provided with an actuating member, generally indicated by the numeral 70, to facilitate rotating and positioning of the indexing ring 51 for mold height adjustment. As shown particularly in FIGS. 2 and 5, the actuating member 70 may include a base 71 affixed to the underside of indexing ring 51, an arm 72 projecting generally radially outwardly of the indexing ring 51, and a hand knob 73 at the end of arm 72 opposite the base 71. Thus the hand knob 73 may be grasped by an operator and manipulated to rotate indexing ring 51 when a mold height adjustment is made in conjunction with installing mold sections having a different height for a different tire size.

Figure 7:
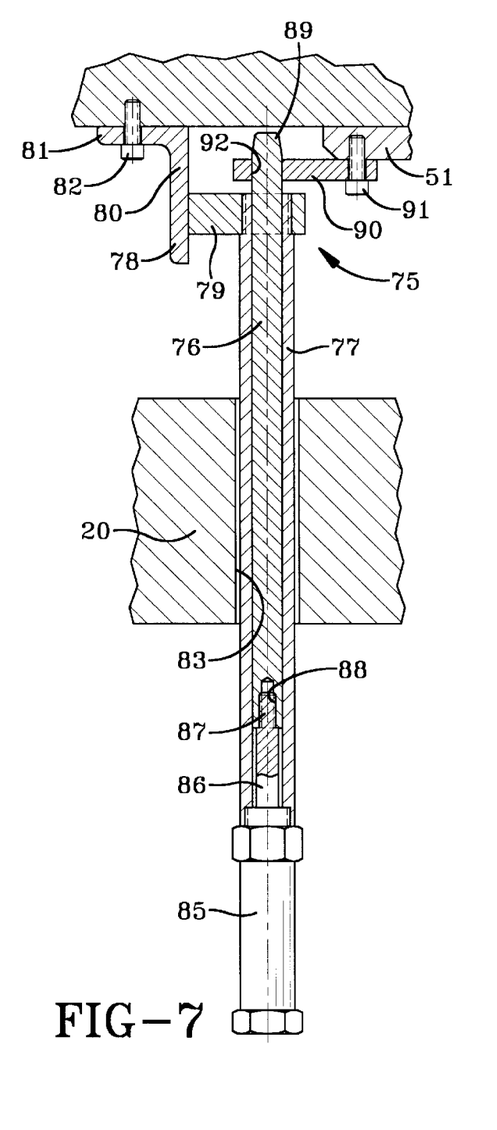
FIG. 7 is a fragmentary sectional view taken substantially along the line 7—7 of FIG. 1 showing a locking pin of a locking mechanism positioned in a selected one of a plurality of ports defining an angular position of the indexing ring.

The indexing assembly 50 is provided with a locking assembly, generally indicated by the numeral 75, which serves to lock the indexing ring 51 in the various mold height positions as described hereinabove. As best seen in FIGS. 1 and 7, the locking assembly effects selective interconnection between the lower bolster 16 and the indexing ring 51 to lock the indexing ring 51 in a desired position or to permit relative rotation therebetween when a mold height adjustment is being made. The locking assembly 75 has as an operative component thereof a locking pin 76 which is slidingly retained within a mounting sleeve 77. The mounting sleeve 77 is held in position by a sleeve support which, as shown, has a lateral arm 79 to which the sleeve 77 is rigidly affixed and a vertical arm terminating in a flange 81 which is secured to the underside of lower bolster 16 as by machine screws 82 or other suitable fasteners. The mounting sleeve 77 is of a sufficient length such as to extend through a bore 83 in the frame 20 and a distance therebelow to accommodate movement of the lower bolster 16 relative to frame 20 during actuation of the lift assembly 25. The mounting sleeve 77 carries at its lower extremity an actuating cylinder 85. The cylinder rod 86 of actuating cylinder 85 has a threaded extension 87 which attaches to a threaded bore 88 in locking pin 76. Thus, the locking pin 76 moves at all times with the cylinder rod 86 of actuating cylinder 85. The locking assembly 75 has an arcuate receiver 90 attached to the lower surface of indexing ring 51 as by machine screws 91 or other suitable fasteners. The arcuate receiver 90 has a plurality of circumferentially spaced ports 92, one for each of the positions where steps 65,66 or position 67 are aligned with the squeeze cylinders 35. As depicted in viewing FIGS. 1 and 7, a port 92 providing alignment with locking pin 76 is provided for each of the three mold height adjustment positions. The locking pin 76 may have a tapered point 89 as seen in FIG. 7 for purposes of facilitating insertion into the various ports 92 by the actuating cylinder 85.

In the normal operation of press 11 the mold height adjustment mechanism 10 is inactive with the indexing assembly 50 maintained in one of its three positions by locking pin 76 engaging a respective port 92 in the arcuate receiver 90. In conjunction with a changeover in press 11 to run a different tire size having a different mold height, the lift cylinders 26 are extended to raise the lower bolster 16 to obtain clearance for the press operator to reposition the indexing ring 51. In that respect the actuating cylinder 85 of locking assembly 75 is operated to retract the locking pin 76 from a port 92. The operator then grasps the actuating member 70 and rotates the indexing ring to one of the other two ports 92 which provides a mold height adjustment which is appropriate for the tire molds to be employed for the next production run. Once the indexing ring 51 is properly located at the desired mold height position actuating cylinder 85 extends the cylinder rod 86 into the respective port 92. With the indexing ring 51 thus appropriately positioned the lift cylinders 26 are retracted allowing the lower bolster 16 to be positioned at the new selected height appropriate for the molds to be employed. It is thus to be appreciated that the press 11 can be readily adapted to run molds having at least three different mold height adjustment positions.

Thus, it should be evident that the tire curing press mold height adjustment apparatus disclosed herein carries out one or more of the objects of the present invention set forth above and otherwise constitutes an advantageous contribution to the art. As will be apparent to persons skilled in the art, modifications can be made to the preferred embodiment disclosed herein without departing from the spirit of the invention, the scope of the invention herein being limited solely by the scope of the attached claims.

What is claimed is:

1. A tire curing press comprising, a frame, a bolster for mounting a lower mold section, a cylinder mounted on said frame, a cylinder rod of said cylinder for moving said bolster and said lower mold section between a closed position and a partially open position, moveable indexing apparatus interposed between said cylinder rod and said bolster, and a plurality of steps of differing thickness on said indexing apparatus, whereby moving a selected one of said plurality of steps into alignment with said cylinder rod establishes a different partially open position of said lower mold section.

2. A tire curing press according to claim 1, wherein said indexing apparatus is an indexing ring which is rotatably mounted.

3. A tire curing press according to claim 2, wherein said indexing ring is suspended from said bolster.

4. A tire curing press according to claim 2, wherein said indexing ring is supported by a plurality of circumferentially spaced roller assemblies.

5. A tire curing press according to claim 4, wherein said roller assemblies include roller brackets mounted on said lower bolster and rollers engaging said indexing ring.

6. A tire curing press according to claim 5, wherein said indexing ring has a bottom surface and a beveled corner with said rollers engaging said bottom surface and said beveled corner to position said indexing ring for rotation relative to said bolster.

7. A tire curing press according to claim 6, wherein said plurality of steps are located on said bottom surface of said indexing ring.

8. A tire curing press according to claim 7, wherein said plurality of steps are circumferentially spaced on said indexing ring.

9. A tire curing press according to claim 1 further comprising, a plurality of lift cylinders for raising said bolster relative to said frame to permit the moving of said indexing apparatus.

10. A tire curing press according to claim 9, wherein said lift cylinders have cylinder casings attached to said frame and cylinder rods supporting said bolster.

11. A tire curing press according to claim 1 further comprising, a locking mechanism selectively interconnecting said bolster and said indexing apparatus to effect retention of said indexing apparatus at selected positions.

12. A tire curing press according to claim 11, wherein said locking mechanism has a locking pin movably mounted on said bolster and a plurality of locking ports on said indexing apparatus for receiving said locking pin.

13. A tire curing press according to claim 12, wherein said locking pin is cylinder-actuated.

14. A tire curing press according to claim 1, wherein said indexing apparatus has an attached handle for moving said indexing apparatus to different positions.

15. A mold height adjustment mechanism for a tire curing press having a frame and a lower bolster for mounting a lower mold section comprising, a cylinder adapted to be mounted on the frame, a cylinder rod of said cylinder adapted to move the lower bolster and lower mold section between a closed position and a partially open position, a movable indexing ring interposed between the lower bolster and said cylinder rod, a plurality of discrete steps of differing thickness on said indexing ring, whereby moving a selected one of said plurality of steps into alignment with said cylinder rod establishes a different partially open position of the lower mold section.

16. A mold height adjustment mechanism according to claim 15 further comprising, a plurality of lift cylinders for raising the lower bolster relative to the frame to permit the moving of said indexing ring.

17. A mold height adjustment mechanism according to claim 15 further comprising, a locking mechanism interconnecting the lower bolster and said indexing ring to effect retention of said indexing ring at selected positions.

18. In a tire curing press having a base and a bolster, a mold height adjustment mechanism comprising, first cylinders mounted on the base and engaging the bolster to move the bolster between a squeeze position and a retracted position, an indexing ring interposed between said first cylinder and the bolster, discrete risers on said indexing ring establishing a retracted position of the bolster for each of said risers, and second cylinders for moving the bolster relative to the base to permit movement of said indexing ring relative to said first cylinders.

19. A tire curing press according to claim 18, wherein said indexing ring is rotatably supported by the bolster.

20. A tire curing press according to claim 19 further comprising, a locking mechanism associated with said indexing ring to effect retention of said indexing ring at selected positions.

21. In a tire curing press having a base and a bolster, a mold height adjustment mechanism comprising, squeeze cylinders mounted on the base and engaging the bolster to move the bolster between a squeeze position and a retracted position, indexing means interposed between said squeeze cylinder and the bolster, discrete step means on said indexing means establishing a retracted position of the bolster for each of said step means, and lift cylinders for moving the bolster relative to the base to permit movement of said indexing means relative to said squeeze cylinders.

22. A tire curing press according to claim 21, wherein said indexing means is a ring rotatably supported by the bolster.

23. A tire curing press according to claim 21, wherein said step means are a plurality of cylindrical blocks affixed to said indexing means.

24. A tire curing press according to claim 21 further comprising, locking means interconnecting the bolster and said indexing means to effect retention of said indexing means at selected positions.

* * * * *